(12) United States Patent
Gibbon et al.

(10) Patent No.: US 9,741,395 B2
(45) Date of Patent: *Aug. 22, 2017

(54) SYSTEM AND METHOD FOR CONTENT-BASED NAVIGATION OF LIVE AND RECORDED TV AND VIDEO PROGRAMS

(71) Applicant: AT&T Intellectual Property II, L.P., Atlanta, GA (US)

(72) Inventors: David Crawford Gibbon, Lincroft, NJ (US); Zhu Liu, Marlboro, NJ (US); Behzad Shahraray, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/696,576

(22) Filed: Apr. 27, 2015

(65) Prior Publication Data

US 2015/0228308 A1 Aug. 13, 2015

Related U.S. Application Data

(63) Continuation of application No. 11/263,048, filed on Oct. 31, 2005, now Pat. No. 9,020,326.

(Continued)

(51) Int. Cl.
| | |
|---|---|
| *H04N 9/80* | (2006.01) |
| *H04N 5/775* | (2006.01) |
| *G11B 27/10* | (2006.01) |
| *G11B 27/28* | (2006.01) |
| *H04N 5/76* | (2006.01) |
| *H04N 7/173* | (2011.01) |
| *H04N 21/2187* | (2011.01) |
| *H04N 21/234* | (2011.01) |

(Continued)

(52) U.S. Cl.
CPC ............ *G11B 27/105* (2013.01); *G11B 27/28* (2013.01); *H04N 5/76* (2013.01); *H04N 7/17336* (2013.01); *H04N 21/2187* (2013.01); *H04N 21/2387* (2013.01); *H04N 21/23418* (2013.01); *H04N 21/44008* (2013.01); *H04N 21/47202* (2013.01); *H04N 21/6587* (2013.01)

(58) Field of Classification Search
CPC ........ G11B 27/01–27/03; H04N 21/21; H04N 21/23; H04N 21/65; H04N 21/80
USPC ................. 386/239–248, 291–299, 353–356
See application file for complete search history.

(56) References Cited

U.S. PATENT DOCUMENTS

| | | |
|---|---|---|
| 5,614,940 A | 3/1997 | Cobbley et al. |
| 5,634,020 A | 5/1997 | Norton |

(Continued)

FOREIGN PATENT DOCUMENTS

| | | |
|---|---|---|
| JP | 06-309381 | 11/1994 |
| WO | WO 92/22983 | 12/1992 |

*Primary Examiner* — Hung Dang

(57) ABSTRACT

A system, method and computer-readable medium are presented for providing real-time content-based navigation of live video programming. The method aspect of the invention comprises receiving a live video program, generating an index to the received live video program by extracting images and/or text from the video program, recording the live video program, presenting at least a portion of data associated with the generated index to a user, receiving user input regarding a portion of the recorded video program to which the user desires to navigate and playing back the recorded video program starting at the navigated portion identified by the user input.

20 Claims, 3 Drawing Sheets

Related U.S. Application Data

(60) Provisional application No. 60/710,695, filed on Aug. 23, 2005.

(51) Int. Cl.
*H04N 21/2387* (2011.01)
*H04N 21/44* (2011.01)
*H04N 21/472* (2011.01)
*H04N 21/6587* (2011.01)

(56) References Cited

U.S. PATENT DOCUMENTS

| | | |
|---|---|---|
| 5,694,163 A | 12/1997 | Harrison |
| 5,703,655 A | 12/1997 | Corey et al. |
| 5,818,510 A | 10/1998 | Cobbley et al. |
| 5,821,945 A | 10/1998 | Yeo et al. |
| 5,835,667 A | 11/1998 | Wactlar et al. |
| 5,983,176 A | 11/1999 | Hoffert et al. |
| 5,995,095 A | 11/1999 | Ratakonda |
| 6,009,336 A | 12/1999 | Harris et al. |
| 6,064,438 A | 5/2000 | Miller |
| 6,118,923 A | 9/2000 | Rodriguez |
| 6,137,544 A | 10/2000 | Dimitrova et al. |
| 6,185,363 B1 | 2/2001 | Dimitrova et al. |
| 6,222,532 B1 | 4/2001 | Ceccarelli |
| 6,243,713 B1 | 6/2001 | Nelson et al. |
| 6,246,790 B1 | 6/2001 | Huang et al. |
| 6,282,549 B1 | 8/2001 | Hoffert et al. |
| 6,336,093 B2 | 1/2002 | Fasciano |
| 6,347,114 B1 | 2/2002 | Blanchard |
| 6,349,275 B1 | 2/2002 | Schumacher et al. |
| 6,360,234 B2 | 3/2002 | Jain et al. |
| 6,363,380 B1 | 3/2002 | Dimitrova |
| 6,370,504 B1 | 4/2002 | Zick et al. |
| 6,374,260 B1 | 4/2002 | Hoffert et al. |
| 6,389,168 B2 | 5/2002 | Altunbasak et al. |
| 6,496,228 B1 | 12/2002 | McGee et al. |
| 6,498,921 B1 | 12/2002 | Ho et al. |
| 6,523,061 B1 | 2/2003 | Halverson et al. |
| 6,567,980 B1 | 5/2003 | Jain et al. |
| 6,628,303 B1 | 9/2003 | Foreman et al. |
| 6,643,620 B1 | 11/2003 | Contolini et al. |
| 6,734,877 B1 | 5/2004 | Kondo et al. |
| 6,816,551 B1 | 11/2004 | Kasutani |
| 2002/0018637 A1 | 2/2002 | Saito |
| 2002/0047905 A1 | 4/2002 | Kinjo |
| 2002/0135608 A1 | 9/2002 | Hamada et al. |
| 2003/0093790 A1 | 5/2003 | Logan et al. |
| 2003/0099459 A1 | 5/2003 | Yanagita et al. |
| 2004/0128317 A1 | 7/2004 | Sull et al. |
| 2005/0028194 A1 | 2/2005 | Elenbaas et al. |
| 2006/0184975 A1 | 8/2006 | Casey |
| 2007/0050827 A1 | 3/2007 | Gibbon et al. |
| 2007/0098350 A1 | 5/2007 | Gibbon et al. |

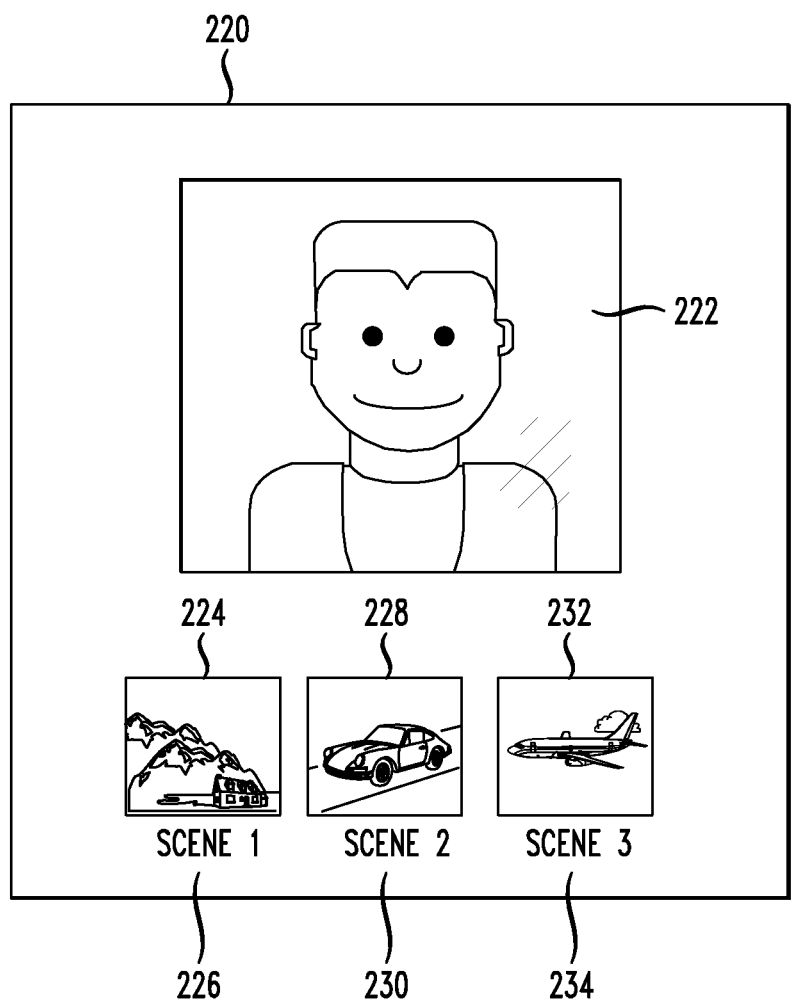

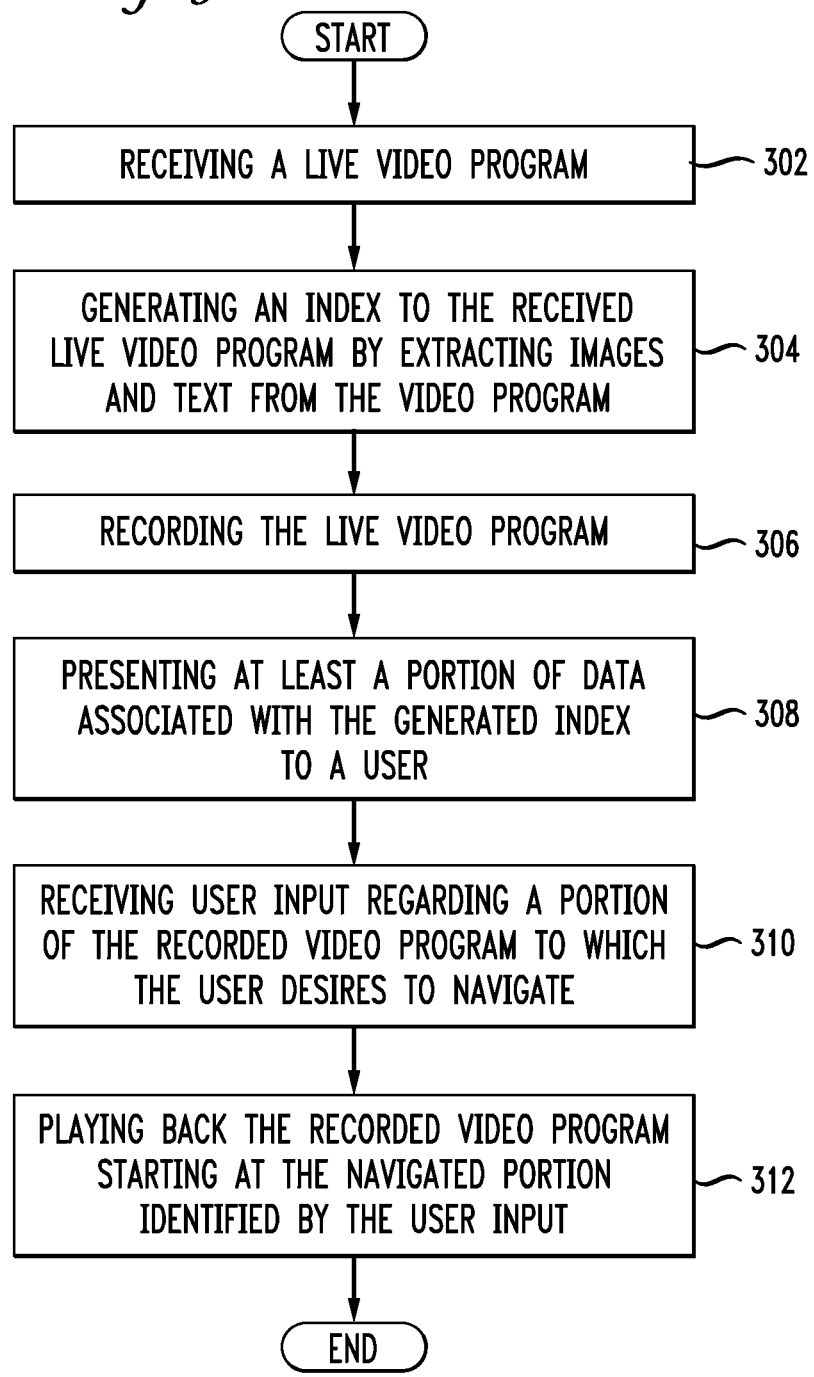

SYSTEM AND METHOD FOR CONTENT-BASED NAVIGATION OF LIVE AND RECORDED TV AND VIDEO PROGRAMS

PRIORITY CLAIM

The present application is a continuation of U.S. patent application Ser. No. 11/263,048, filed Oct. 31, 2005, which claims priority to U.S. Provisional Application No. 60/710,695 filed Aug. 23, 2005, the contents of which are incorporated herein by reference in their entirety.

BACKGROUND OF THE INVENTION

1. Field of the Invention

The present invention relates to navigating video content and more specifically to a system and method of real-time processing and navigation of TV and Video content using advanced navigation and information derived from the media.

2. Introduction

Methods for content-based searching and browsing of recorded TV and video content have been proposed. Such content-based methods extract information from the media by processing the image sequences (to extract a pictorial index of a program) and the linguistic information in form of closed captioning text, or text extracted automatically by performing speech recognition. The words and images are then used to search for relevant content or to navigate the video program in a content-based way. The advent of digital recorders (DVR, PVR, Windows Media Center Edition), and TV set-top-boxes not only has enabled the recording of TV programs for later viewing, but also has enabled users to pause and restart the live TV as well as jump backwards in the video to an earlier point, and jump forward to a point in live program that has been already recorded.

The current state-of-the-art in performing such navigation relies on a forward and backward button on the GUI or on a remote control to jump backward or forward by a predetermined fixed amount, or put the replay in a rewind or fast-forward mode while displaying the video and rely on the user to stop this fast motion and go back to normal play mode, or to move a slider left or right to go backward or forward in the program. The only feedback mechanism used during this process is usually a timeline showing the current position of the live broadcast, and the temporal position of the current replay.

What is needed in the art is an improved way of navigating live TV/Video broadcasts.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The linear navigation of the live video can be significantly improved by using more intelligent, content based indexing techniques. By presenting a pictorial index of the video program showing the different scenes, the user can non-linearly jump to the points of interest in the program (forward and backward) by selecting the scene of interest (from a GUI or using a remote). Unlike the case where the processing for extracting this pictorial index is performed on the entire program, for live broadcasts, the pictorial index extraction is done in real-time as the video is being received and is ready to be used for navigation immediately. In one embodiment, the indexing information can accompany the program and just be used by the system for navigational purposes. However, the preferred embodiment covers the case where the receiving set-top-box or other video replay device processing the incoming data to extract such information automatically.

Examples of the context of the need for this invention include where DVR (digital video recorder), PVR (personal video recorder), TiVo® live TV pausing, personal computers equipped with hardware and software to support PVR-like functionality (e.g., Microsoft Media Center Edition operating system and the like) and other capabilities where users can store live TV for review and later viewing. The invention provides for methods, systems and computer-readable media for content-based navigation of live and recorded TV or video broadcasts.

An example method embodiment of the invention comprises a method for providing real-time content-based navigation of live video programming. Example steps include receiving a live video program, generating an index to the received live video program by extracting images and/or text from the video program, recording the live video program, presenting at least a portion of data associated with the generated index to a user, receiving user input regarding a portion of the recorded video program to which the user desires to navigate and playing back the recorded video program starting at the navigated portion identified by the user input.

Other system and computer-readable medium embodiments are also contemplated of a similar scope to the method. The system would utilize, for example, programmed modules that would perform the steps set forth in the method embodiment. The computer-readable medium would store instructions to enable a computing device to perform the steps of the invention.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B illustrates a display which includes extracted images and text used for navigation; and FIG. 3 illustrates a method embodiment of the invention.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
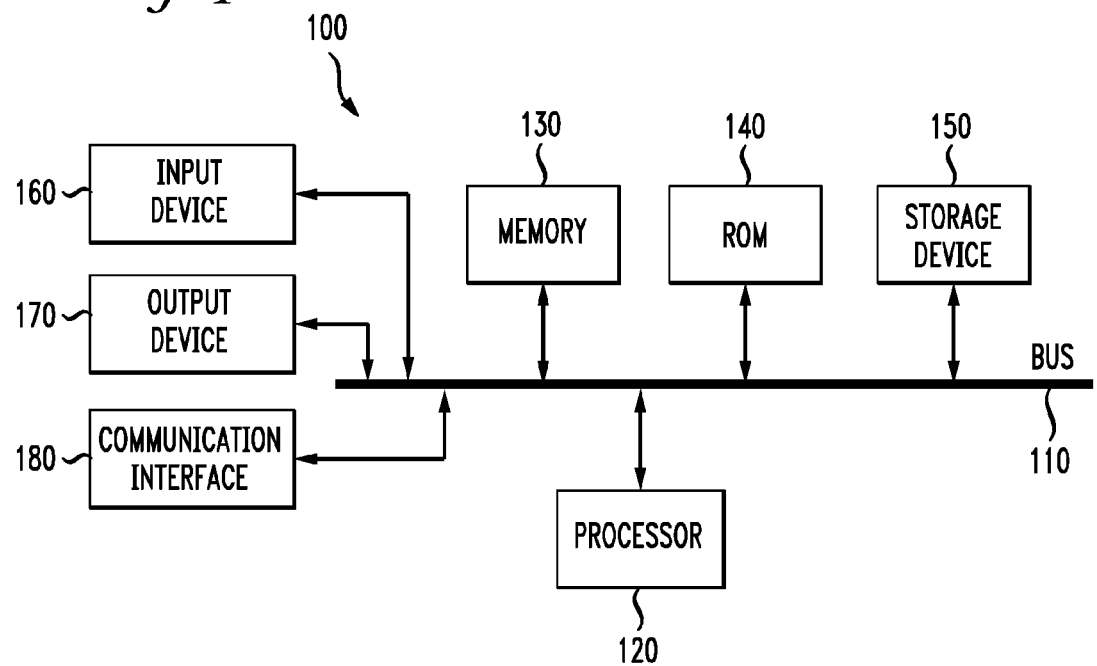
FIG. 1 provides an example system embodiment of the invention.

FIG. 1 and the related discussion are intended to provide a brief, general description of a suitable computing environment 100 in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system 100 for implementing the invention includes a general purpose computing device in the form of a conventional personal computer 100, including a processing unit (CPU) 120, a system memory 130, and a system bus 110 that couples various system components including the system memory 130 to the processing unit 120. The system bus 110 may be any of several types of bus structures including a memory bus or memory controller, a peripheral bus, and a local bus using any of a variety of bus architectures. The system memory 130 includes read only memory (ROM) 140 which may also include random access memory (RAM) 140. A basic input/output (BIOS), containing the basic routine that helps to transfer information between elements within the personal computer, such as during start-up, is stored in ROM 140. The personal computer further includes a disk drive 150 for storing data. Other storage media such as a magnetic disk, removable disk, optical disk and so forth may be utilized as well. The storage device 150 is connected to the system bus 110. The drives and the associated computer-readable media provide nonvolatile storage of computer readable instructions, data structures, program modules and other data for the personal computer 100.

Although the exemplary environment described herein employs the hard disk, it should be appreciated by those skilled in the art that other types of computer readable media which can store data that is accessible by a computer, such as magnetic cassettes, flash memory cards, digital video disks, Bernoulli cartridges, random access memories (RAMs) read only memory (ROM), and the like, may also be used in the exemplary operating environment. An input device 160 and an output device 170 communicate with the bus 110 to process data between the device 100 and a user. These include such features as keyboard, touch-sensitive pad, mouse or similar device, motion sensing, automatic speech recognition (natural language spoken dialog interfacing) and so forth. Any type of interaction with the computing device may be utilized. A communication interface 180 will provide communication as is known in the art to other computing devices for networking or other purposes.

Figure 2A:
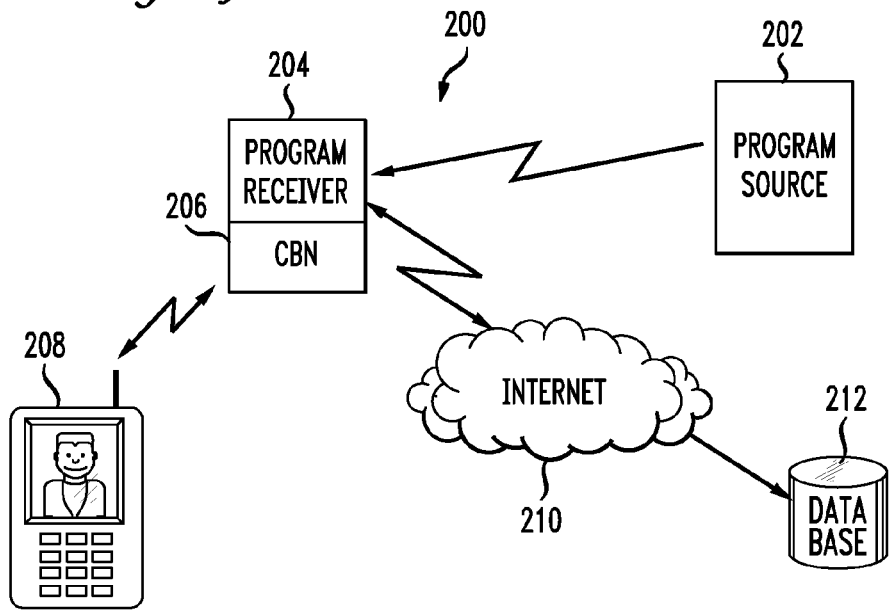
FIG. 2A illustrates another example system embodiment of the invention.

FIG. 2A illustrates the general system embodiment of the invention in the context of receiving a video program. System 200 includes a program source 202 that communicates a video program to a program receiver 204. A content-based navigation (CBN) module 206 is associated with the receiver 204 for performing the steps and processes of the invention. A separate computing device 208 may be a hand-held remote or other type of device which the user can hold to utilize the navigation capabilities of the invention. The program source may be any known to those of skill in the art. For example, cable, satellite, broadcast, the Internet, or any other type of programming source is contemplated. The program receiver 204 is any computing device such as a TiVo®, digital video recorder (DVR) or any other type of computing device that is programmed and capable of receiving the broadcast video programming.

FIG. 2B illustrates an example of a video display 220 that comprises a video presentation 222 and a series of extracted images and text. These are shown as part of the display but the extracted images may also be only presented on the separate display 208. Images 224, 228 and 232 as well as associated text 226, 230, 234 are available for the user for navigation of the video presentation 222. Of course, variations on this presentation are contemplated, such as text only, video images only or some other combination.

An aspect of the present invention relates to a system, method and computer-readable medium for real-time processing of live TV/video broadcasts to extract images and text to generate an index into the program. FIG. 3 illustrates a method embodiment of the basic steps of the invention. As shown in FIG. 3, the method comprises receiving a live video program (302), generating an index to the received live video program by extracting images and text from the video program (304), recording the live video program (306), presenting at least a portion of data associated with the generated index to a user (308), receiving user input regarding a portion of the recorded video program to which the user desires to navigate (310) and playing back the recorded video program starting at the navigated portion identified by the user input (312).

The index may be used to jump backward and forward to points of interest or locations within the programming to which the user desires to navigate based on the images and/or text. In the case of a live broadcast, the user could navigate up to the point that the live broadcast has been reached. In the case of Video on Demand, the user can navigate to any point in the program. The index (e.g, a pictorial, textual, or combination of both) can be presented to the user on the same display that is being used to play the video 204, or can be put on another device such as a hand-held remote control device 208 with a display which is capable of displaying the images and/or text and accepting user input. Preferably, the handheld device would have a touch or pen sensitive screen or other means of navigation or selection known to those of skill in the art. Wired or wireless communications may be utilized to communicate with a mobile computing device.

The components for creating such a system may comprise video processing techniques (such as performed by a content-based sampling module) to extract the index frames. For text, any type of module that extracts closed caption text or text generated from the spoken words utilizing automatic speech recognition. Further, closed captioning may include several different languages and various means may be employed to retrieve one or more of the languages in the closed captioning information. Further, the textual information can be supplied/extracted from other sources such as teletext, or subtitles in case of contents such as DVD movies which contain subtitles in several languages.

One aspect of the present invention is the use of content-based navigation to live broadcasts. The invention fulfills the need to create easy-to-use and effective navigation mechanisms to enable the user to play a particular scene of the live video again, or skip over unwanted content (e.g., commercials) in a reliable way. The other attempts to do this are limited to fixed jumps, and fast-forward, rewind mechanisms. The points to which the user can jump can be supplied ahead of time and sent with the content, can be automatically extracted by processing the content or can simply manually be bookmarked by the viewer.

As an example of the invention in operation, assume a user may "TiVo" or record a video program such as a sitcom. While the user records the program on a hard disk or some other medium on a local computing device 204, the method involves generating an index of the video program as it is being recorded. The user may be watching the program as it is being recorded and can navigate back and forth without interfering with the recording process. Therefore, once the program or a part of the program is recorded, the user can more easily navigate through the program. Instead of being presented with an opportunity to linearly rewind or fast forward, the invention involves presenting to the user a portion of the index such as images and text such that the user can skip directly to the portion of the sitcom after the commercials. The portion of data associated with the index is at least one of images extracted from the live video program, text or a combination of text and images, and may be scrolled to view the index for the portions of interest. The portion of data associated with the index may also be other data obtained externally from the live video program such as an external database or the Internet. The portion of the data may also accompany the live video program in a separate bitstream or in some other fashion. An example of this approach is where information about each actor such as name, history, other programs, etc. may be obtained from the Internet (or any other source separate from the source of the video program being recorded) while the program index is being generated. The local set-top box 204 that stores the program may be in communication with the internet 210 and contact a webservice 212 that supplements the index as it is generated. FIG. 2A illustrates several of these features. This enables the index to have up-to-date information. Furthermore, if the user accesses the index later, such as, for example, one month later, the index can also be again updated from the time it was created.

There is no specific requirement of the invention regarding where a program is recorded. In other words, current DVR or TiVo systems locally store the video programming but an aspect of the invention may involve storing the video program on a network or the internet for later access and indexed navigational viewing.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, there may be applications to this invention for offering services where a user can browse content before a program has completely aired in such consumer video space as through advanced IP video services such as IPTV. Accordingly, the appended claims and their legal equivalents should only define the invention, rather than any specific examples given.

We claim:
1. A method comprising:
   generating an index to a video program based on an indication of a portion of interest in the video program, wherein the index is (1) generated independent of index information transmitted with the video program and (2) is generated automatically, via a processor and without user input, by combining extracted images and text generated from the video program with network-based content provided by an external source, the network-based content being transmitted separately from the video program;
   presenting the index on a display, wherein:
      presenting of the index occurs on a first computing device different from a second computing device which displays the video program;
      the first computing device is a hand-held device comprising a touch-sensitive screen;
      the hand-held device presents the extracted images and the text; and
      the video program is navigated via touch input received from the touch-sensitive screen of the hand-held device;
   receiving, based on the index, user input regarding a location of the video program to navigate to; and playing the video program, on the display, from the location.

2. The method of claim 1, wherein the network-based content is transmitted concurrently with the video program.

3. The method of claim 1, wherein the external source is a server connected via the Internet.

4. The method of claim 1, wherein generating of the index further comprises utilizing content-based sampling.

5. The method of claim 1, further comprising extracting the extracted images from the video program using content-based sampling.

6. The method of claim 1, further comprising generating the text using automatic speech recognition.

7. The method of claim 1, wherein the hand-held device is wireless.

8. A system comprising:
a processor; and
a computer-readable storage medium having instructions stored which, when executed by the processor, result in the processor performing operations comprising:
generating an index to a video program based on an indication of a portion of interest in the video program, wherein the index is (1) generated independent of index information transmitted with the video program and (2) is generated automatically, without user input, by combining extracted images and text generated from the video program with network-based content provided by an external source, the network-based content being transmitted separately from the video program;
presenting the index on a display, wherein:
presenting of the index occurs on a first computing device different from a second computing device which displays the video program;
the first computing device is a hand-held device comprising a touch-sensitive screen;
the hand-held device presents the extracted images and the text; and
the video program is navigated via touch input received from the touch-sensitive screen of the hand-held device;
receiving, based on the index, user input regarding a location of the video program to navigate to; and
playing the video program, on the display, from the location.

9. The system of claim 8, wherein the network-based content is transmitted concurrently with the video program.

10. The system of claim 8, wherein the external source is a server connected via the Internet.

11. The system of claim 8, wherein generating of the index further comprises utilizing content-based sampling.

12. The system of claim 8, the computer-readable storage medium having additional instructions stored which, when executed by the processor, result in operations comprising extracting the extracted images from the video program using content-based sampling.

13. The system of claim 8, the computer-readable storage medium having additional instructions stored which, when executed by the processor, result in operations comprising generating the text using automatic speech recognition.

14. The system of claim 8, wherein the hand-held device is wireless.

15. A computer-readable storage device having instructions stored which, when executed by a computing device, result in the computing device performing operations comprising:
generating an index to a video program based on an indication of a portion of interest in the video program, wherein the index is (1) generated independent of index information transmitted with the video program and (2) is generated automatically, without user input, by combining extracted images and text generated from the video program with network-based content provided by an external source, the network-based content being transmitted separately from the video program;
presenting the index on a display, wherein:
presenting of the index occurs on a first computing device different from a second computing device which displays the video program;
the first computing device is a hand-held device comprising a touch-sensitive screen;
the hand-held device presents the extracted images and the text; and
the video program is navigated via touch input received from the touch-sensitive screen of the hand-held device;
receiving, based on the index, user input regarding a location of the video program to navigate to; and
playing the video program, on the display, from the location.

16. The computer-readable storage device of claim 15, wherein the network-based content is transmitted concurrently with the video program.

17. The computer-readable storage device of claim 15, wherein the external source is a server connected via the Internet.

18. The computer-readable storage device of claim 15, wherein generating of the index further comprises utilizing content-based sampling.

19. The computer-readable storage device of claim 15, having additional instructions stored which, when executed by the computing device, result in operations comprising extracting the extracted images from the video program using content-based sampling.

20. The computer-readable storage device of claim 15, having additional instructions stored which, when executed by the computing device, result in operations comprising generating the text using automatic speech recognition.

* * * * *